Figure 12:
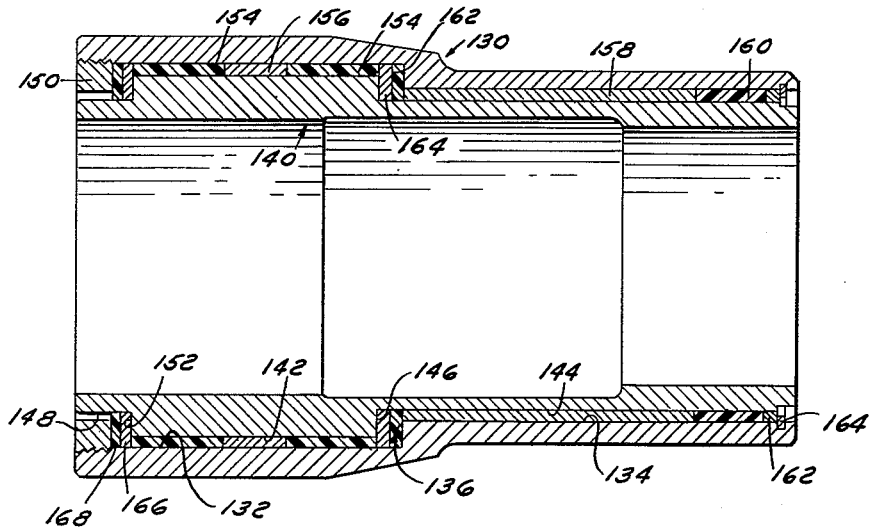

July 13, 1954  N. SKILLMAN, JR., ET AL  2,683,637
COMPOUND BEARING
Filed March 15, 1952  4 Sheets-Sheet 1
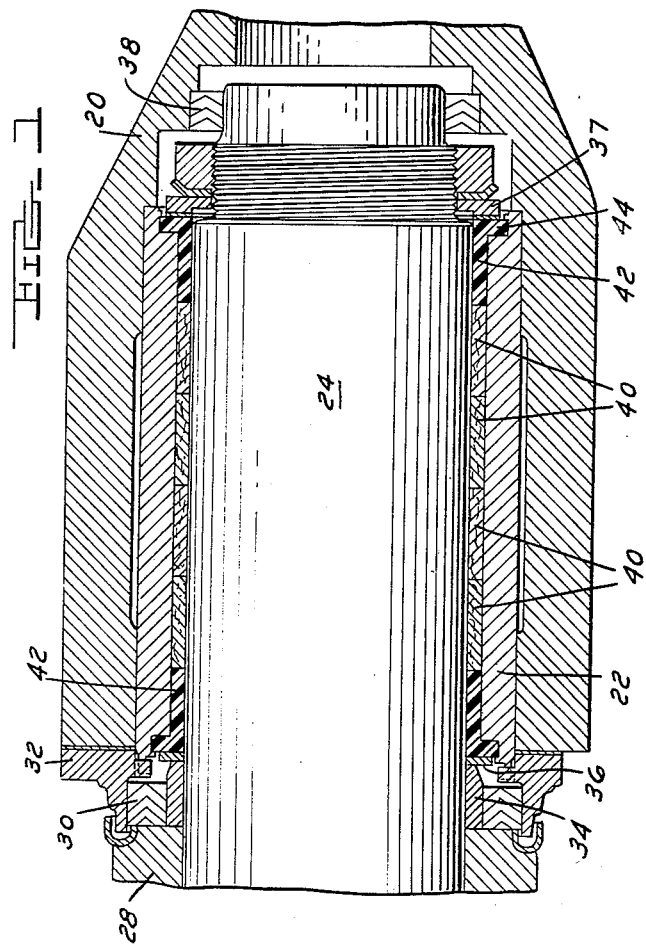
INVENTORS
NEWTON SKILLMAN JR.
JOHN E. CONNOLLY
BY FRED R. SMITH
AXEL W. KOGSTROM.
Barnes, Kisselle, Laughlin & Raisch
ATTORNEYS July 13, 1954  N. SKILLMAN, JR., ET AL  2,683,637
COMPOUND BEARING
Filed March 15, 1952  4 Sheets-Sheet 2
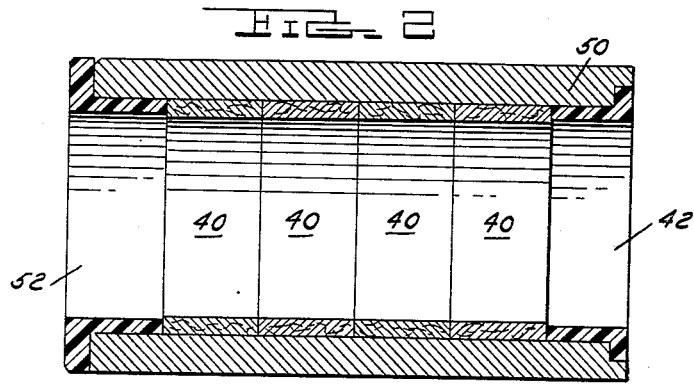
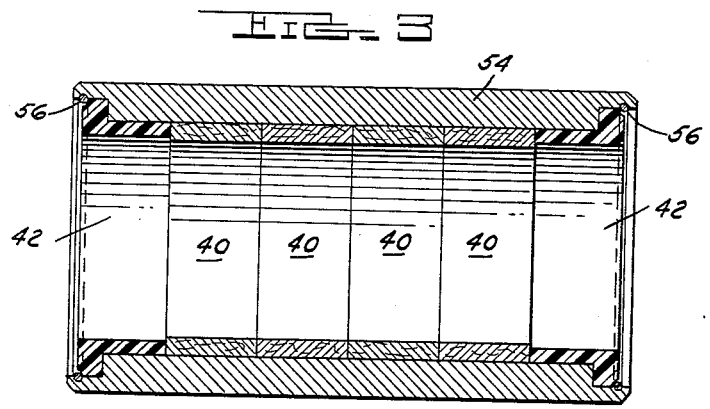
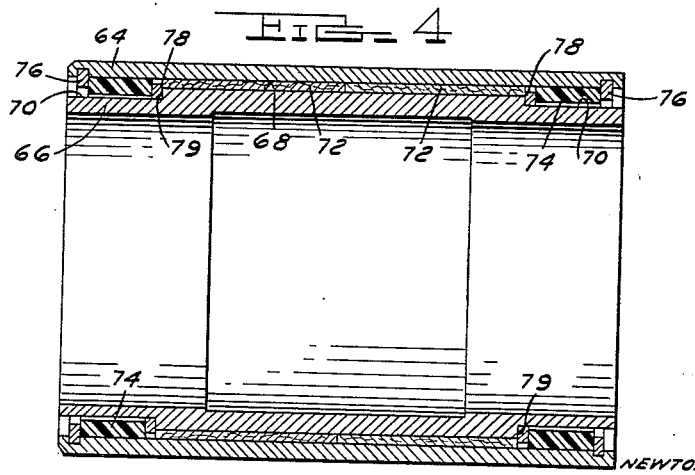
INVENTORS
NEWTON SKILLMAN JR.
JOHN E. CONNOLLY
FRED R. SMITH
AXEL W. KOGSTROM
BY
Barnes, Kisselle, Laughlin & Raisch
ATTORNEYS

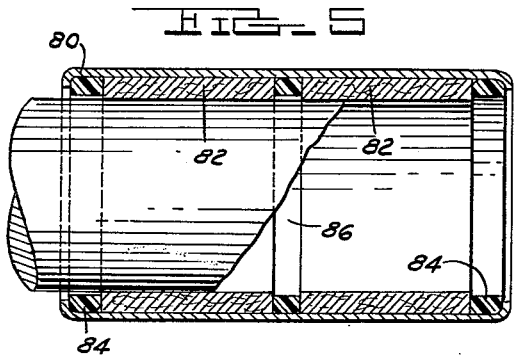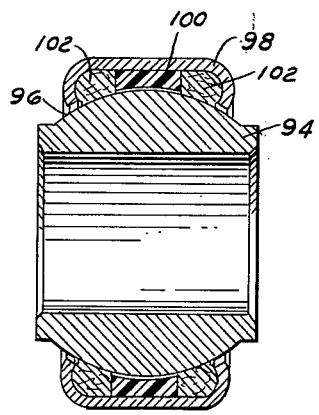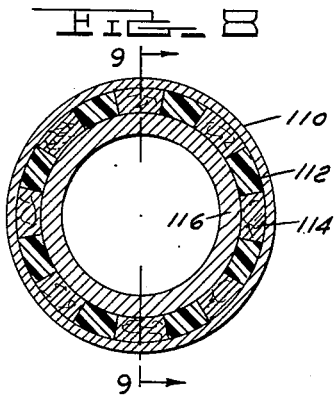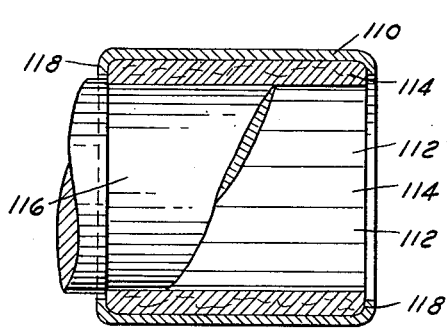

July 13, 1954 N. SKILLMAN, JR., ET AL 2,683,637
COMPOUND BEARING
Filed March 15, 1952 4 Sheets-Sheet 4

INVENTORS
NEWTON SKILLMAN JR.
JOHN E. CONNOLLY
BY FRED R. SMITH
AXEL W. KOGSTROM

Barnes, Kisselle, Laughlin & Raisch
ATTORNEYS

Patented July 13, 1954

2,683,637

UNITED STATES PATENT OFFICE 2,683,637

COMPOUND BEARING

Newton Skillman, Jr., John E. Connolly, Fred R. Smith, and Axel W. Kogstrom, Detroit, Mich., assignors to O. & S. Bearing Company, Detroit, Mich., a corporation of Michigan Application March 15, 1952, Serial No. 276,732

19 Claims. (Cl. 308—239)

This invention relates to a bearing construction and relates particularly to a type of bearing which is adapted for oscillatory movement under heavy loads and without the need of an external supply of lubricant.

It is an object to provide a bearing which is useful in all dimensions and which can be constructed of reasonably inexpensive materials and which is self-lubricating.

It is a further object to provide a bearing which can carry extremely heavy loads, particularly loads of shock nature which occur only at infrequent intervals in the use of the bearing. Also, the bearing is designed to bear extreme corner loads and end thrust loads, as well as extreme combined axial and radial loads.

Briefly, the invention consists in the use of a bearing having inner and outer members with a lubricant-impregnated material interposed between said members together with spaced bearing inserts of plastic, such as moulded or cast nylon, placed with relation to the lubricant-impregnated material such that the normal loads of the bearing will be carried by the lubricant-impregnated material and overloads or shock loads on the bearing will be shared by the plastic inserts.

This arrangement assures protection for the lubricant-impregnated material which is frequently a form of fabric that will fail if subjected to extreme shock loads. Actually, an overload is, in a sense, decelerated or partially absorbed by the lubricant-impregnated fabric as it compresses to the point that the plastic inserts receive the load. Nylon or a similar plastic is also resilient to a degree so that both materials will function finally to absorb the load.

In addition, the combination is particularly adapted to end thrust resistance since the dense plastic may be used to absorb heavy end thrust loads through the outer bearing wall without disturbing the compressed fabric.

Another valuable feature of the present invention is adaptability to a design to be disclosed wherein the denser plastic of the construction may transfer end thrust loads directly to the metal wall of the bearing without axial load on the fabric but at the same time the plastic may constrain the fabric axially, but the impregnated fabric also aids the plastic in furnishing to it a lubricant which improves its wear characteristics.

Other objects of the invention include details of design in which the components of the bearing serve as a retaining means for each other.

Drawings accompany the specification, and the various views thereof may be briefly described as:

Figure 1, a detailed cross section of a bearing assembly utilizing the construction of the present invention.

Figure 2, a view of the external bearing unit separated from assembly.

Figure 3, a view of a modified construction of the external bearing unit.

Figure 4, a view of a modified design in which both radial and axial loads are absorbed within the bearing assembly.

Figure 5, a view of an external bearing unit of simplified construction for use with smaller diameters.

Figure 6, a view of a small bearing unit embodying the principles of the invention.

Figure 7, a view of a spherical bearing unit embodying the principles of the invention.

Figure 8, a view of another method of embodying the principles of this invention by arranging alternate strips of fabric and nylon substantially parallel to the axis of the bearing.

Figure 9, a sectional view on line 9—9 of Figure 8.

Figure 10:
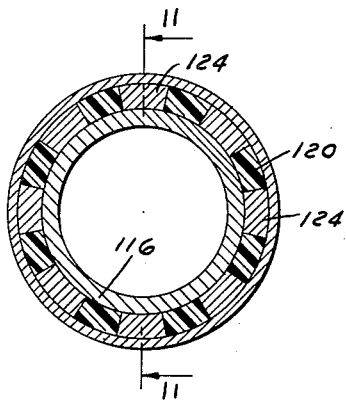

Figure 10, sectional view of a modified construction of Figure 8.

Figure 11:
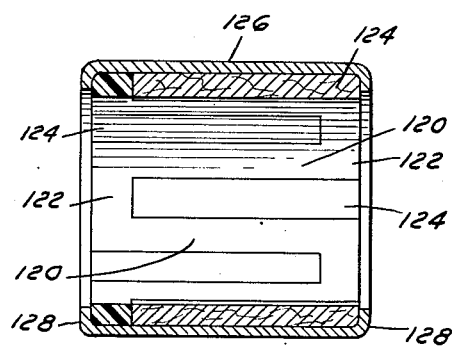

Figure 11, a longitudinal section on line 11—11 of Figure 10.

Figure 12, a modification of a combination bearing designed for heavy end thrust loads.

Figure 13:
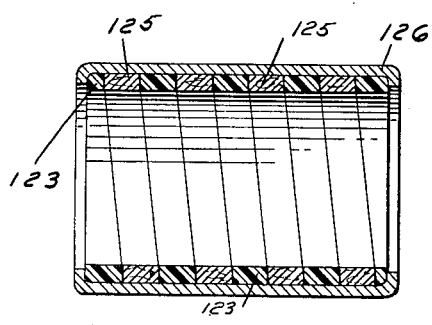

Figure 13, a modification of a bearing somewhat similar to Figure 11 showing a helical, wrapped bearing of nylon and fabric.

Referring to the drawings and particularly to Figure 1, a bearing is shown having an outer housing 20. Within this housing a bearing unit 22 is shown supporting an inner shaft 24. A member 28 is mounted on the end of the shaft 24 and receives support from the housing 20. An outer seal 30 is provided inside of a retaining flange 32. Inside of the seal 30 is a thrust ring 34 which bears against a thrust washer 36. An inner seal 38 is provided at the other end of the bearing member 24.

Referring to the bearing specifically, it consists of a housing 22 cylindrical in shape and having within its confines fabric bearing inserts 40 which line the inner wall of the housing. At each end of the fabric inserts is a molded nylon insert 42. The radially extending flanges 44 of the insert extend into annular enlargements of the housing 22.

The inserts 40 are formed of compressed fabric, preferably woven cotton fabric, and are formed and compressed axially in a manner defined in Patent No. 2,560,134, issued July 10, 1951. These units are confined within the bearing by the plastic inserts 42 which are staked or fastened by other suitable means into the housing 22.

A somewhat similar type of bearing is shown in Figures 2 and 3. In Figure 2 an outer housing 50 encloses the fabric rings 40 and, at one end, has a molded insert 52 of plastic which extends over the radial portion of the end surface of the housing. The molded insert 42 at the other end is similar to those shown in Figure 1.

In Figure 3, a housing 54 encloses inserts 40 with flanged plastic inserts 42, as shown in Figure 1, which are retained by split rings 56 at the end of the bearing. As best shown in Figures 2 and 3, there is a different internal diameter of the compressed inserts 40 and the plastic inserts 42 and 52. In both these bearings of Figures 2 and 3 a cylindrical inner member as shown in Figure 1 would be used. This inner member is a part of the combination but has been omitted in these views to clarify the disclosure.

The compressed fabric bushings have an internal diameter which fits the bearing shaft without appreciable clearance, but the plastic bushings are made with a slight clearance on the shaft, in the order of a few thousandths of an inch. A shaft fitted through the bearing opening will receive its main and normal support from the fabric inserts 40 which are impregnated with a lubricating compound such as disclosed in the patent to Delp, No. 2,379,478, issued July 3, 1945.

The clearance between the fabric rings and the plastic inserts will vary, depending on the thickness of the fabric, but this clearance is always less than the elastic limit of the fabric. To be more specific, this clearance is such that if the fabric is compressed to the point where the load is simultaneously borne by the nylon inserts the compression of the fabric will still not be such as to crush and break-down the fibers in the fabric inserts.

Thus, a normal oscillation load on a bearing of this type will receive its main support on the plurality of fabric inserts, but should a shock load be applied to the bearing the end units of nylon will share this load momentarily and then allow the fabric to return to its normal function. This action is brought about due to the resilience of the bearing material.

The fabric carries normal oscillation loads, but an overload, especially a shock load, will be decelerated by the fabric as the inner member approaches the outer member. Then, the nylon will pick-up the load and share it until it is fully absorbed or relieved. The nylon or other similar molded or cast plastic has a resilience also which permits both materials to function together.

As shown best in Figure 1, the flanged design of the plastic inserts with the radial overlap is well adapted to end thrust resistance. The radial portion of the insert can cap the end of the housing as shown in Figure 2 or extend into and over a portion of the housing as shown in Figures 2 and 3. In combination with the end thrust ring 34 and washer 36 the load is transferred from the inner member to the outer member through the insert. At the other end of Figure 1, washer 37 serves to transfer end thrust.

Another feature of the combination is that the lubricant with which the fabric inserts are impregnated will, under operating conditions, be carried to the nylon inserts and thus lubricate the surface thereof.

In Figure 4, a modified type of construction is shown in which the effective diameter of the bearing materials is different. An external bearing housing 64 has a cylindrical inner surface and the interior bearing member 66 has a main cylindrical surface 68 and end cylindrical surfaces 70.

Fabric inserts 72 serve to carry the main radial load of the bearing, but cylindrical nylon inserts 74 held in place by snap rings 76 and thrust rings 78 co-operate with the surfaces 70 to share shock loads and thus prevent crushing and shearing of the cotton fibers. In addition, the nylon inserts in co-operation with the snap ring 76 and thrust rings 78 and the shoulder 79 of the inner member 66 provide an end thrust resistance which is excellent and which does not disturb the fabric inserts.

It will be seen that end thrust loads will be transferred directly from the housing 64 to the inner member through the plastic end rings and the confining rings 76 and 78. Thus, the fabric inserts 72 are protected against buckling overloads by the shoulder 79 on the inner member 66.

In Figures 5, 6 and 7, modifications are shown of similar embodiments of the invention.

In Figure 5, a sheet metal shell 80 has two fabric inserts 82 and nylon inserts 84 at each end with a spacing nylon insert 86 in the center.

Figure 6 is somewhat similar with a housing 88, a fabric insert 90, and end rings of nylon 92. These embodiments of Figures 5 and 6 are useful for small bearings, especially where corner or shock loading may occur.

In Figure 7, a bearing member 94 having a spherical surface 96 is shown with an external bearing housing 98 having a nylon center insert 100 and fabric inserts or bushings 102. In this embodiment as well as those of Figures 5 and 6 the clearance between nylon and the moving member is maintained statically or under light loads. The resilience of the fabric causes a sharing of load under shock conditions or heavy loads as previously described.

In Figures 8 and 9 another embodiment of the invention is shown. Here, within a shell 110 alternate strip inserts of nylon 112 and impregnated fabric 114 are arranged parallel to each other and to the axis of the bearing. An inner member 116 has the same relation to the inserts as previously described wherein there is clearance between the nylon and the moving member in normal load. The ends 118 of the shell are turned in to confine the inserts.

In Figures 10 and 11 another construction similar to Figures 8 and 9 is shown. Here the plastic is arranged as a ladder-like construction, with alternate ends connected, providing axial strips 120 connected by ends 122. Strips of fabric 124 are interposed to fill the spaces. All are confined in housing 126 having inturned ends 128.

An inner member 116 as shown in Figure 9 is used with the showing of Figures 11 and 13 but is omitted from the drawings to permit full view of the inserts. Both of these modifications of Figures 8 to 11 are well adapted to resist end thrust due to the straight-through form of the nylon.

In Figure 13 I have shown a combination of a nylon and fabric strip shown in parallel relation in a helical form within a cylindrical housing 126. Strips of nylon 123 are arranged in parallel relation with fabric 125. This design is especially adapted to self-lubrication of the plastic by the wiping action of the movable member past the impregnated spiralled fabric.

In Figure 12 is shown a heavy duty bearing designed for unusually heavy axial and overhanging loads. An outer shell 130 has a two-step interior cylindrical surface, a larger end 132 and a reduced end 134 connected by a shoulder 136. An inner member 140 has large cylindrical surface 142 and a smaller surface 144 connected by a shoulder 146. A reduced end 148 on inner member 140 accommodates a threaded ring 150, which is received in the end of the large end 132 of the outer shell 130. A shoulder 152 between portion 148 and the portion 142 is thus axially opposed to the inner side of ring 150.

Between bearing surface 132 and 142 of the members there are locked two nylon rings 154 separated by a fabric ring 156. Between the surfaces 134 and 144 of the bearing member is located a bearing ring 158 and also a nylon ring 160 held in place by a strong thrust ring 162 locked in by a split ring 164.

Between shoulders 136 and 146 is a nylon washer 162 and a steel thrust washer 164 which fills the space between the shoulders with operating clearance between the washer and the inner member. Between the shoulder 152 on the inner member and the threaded ring 150 is a steel thrust washer 166 and a nylon ring washer 168.

It will be seen that the steel thrust washers 164 and 166 together with the adjacent rings 162 and 168 co-operating with the shoulders 136, 146 and the ring 150 will absorb all end thrust in the bearing structurally through the bearing elements without placing any end thrust load on the ring inserts 154, 156, 158 and 160 which carry the radial loads.

In addition, the thrust washers confine the radial load bearing members to prevent any extrusion or flow of these members due to unusually heavy loads. Thus, the bearing of Figure 12 is well integrated for unusual loading.

In most of these embodiments it is the principal purpose of the lubricant-impregnated fabric to carry the normal load and absorb the normal movement of the bearing. The wear on the nylon is thus very slight, but the nylon is always present to share the shock loads. Nylon, though resilient, has a much higher yield point than the fabric and thus protects the fabric against breakdown. In addition, the lubricant from the fabric is carried to the nylon in sufficient quantity by the movement and the pressure of the bearing to lubricate the plastic in use.

It will be understood that dense plastics other than nylon may be substituted for the nylon inserts described. Nylon of the commercial variety, however, has proved very satisfactory.

It will be recognized that one of the great advantages of the present bearing, particularly for heavy loading, is the distribution of the load throughout the bearing area so that the load per square inch is within the elastic limit. In a metallic bearing, despite the accuracy with which it is made there is only line contact between the inner and outer members and frequently a heavy loading of the metallic bearing when it is not in operation will cause what is called "brinelling," which means that the inner bearing member works into the outer bearing member along the line of contact, thus causing an uneven bearing surface.

With the present construction, inasmuch as the plastic material and the fabric material are slightly resilient and flowable, complete cylindrical contact can be obtained at least on the lower half of the bearing so that the load is distributed over the total area of the bearing and the per square inch load is thus reduced to a point within the elastic limit of the parts. Thus, for many installations a bearing formed of nylon and fabric is more satisfactory than a metallic bearing for heavy loads.

We claim:

1. A bearing comprising spaced members positioned in load bearing relation, one to be movable relative to the other, and bearing material interposed between said members comprising one or more compressed fabric material inserts impregnated with a lubricant and one or more inserts of dense plastic such as nylon between said members adjacent said fabric material, said inserts being stationary with respect to each other and one of said members, said fabric being dimensioned to fill the space between the members and to serve in primary load carrying capacity, the plastic inserts being dimensioned in thickness and positioned to clear the moving member by a few thousands of an inch in normal operation of the bearing, said fabric being compressible to the extent of said clearance without destruction of the fibers therein.

2. A bearing comprising spaced members positioned in load bearing relation, one to be movable relative to the other, and bearing material interposed between said members comprising one or more inserts of resilient material impregnated with a lubricant and one or more inserts of dense, slightly flowable plastic between said members adjacent said impregnated material, said inserts being stationary with respect to each other and one of said members, said impregnated material being dimensioned to fill the space between the members and to serve in primary load carrying capacity, the plastic inserts being dimensioned in thickness and positioned to confine the edges of the resilient material and to clear the moving member by a few thousandths of an inch in normal operation of the bearing, said impregnated material being compressible to the extent of said clearance without destruction thereof.

3. A bearing comprising spaced members positioned in load bearing relation, one to be movable relative to the other, and bearing material interposed between said members comprising one or more compressed fabric material inserts impregnated with a lubricant and one or more inserts of dense plastic between said members adjacent said fabric material, said inserts being stationary with respect to each other and one of said members, means to restrain said plastic inserts against movement at right angles to the normal bearing load, said fabric being dimensioned to fill the space between the members and to serve in primary load carrying capacity, the plastic being dimensioned in thickness and positioned to clear the moving member by a few thousandths in normal operation of the bearing, said fabric being compressible to the extent of said clearance without destruction of the fibers therein.

4. A bearing comprising spaced members positioned in load bearing relation, one to be movable relative to the other, and bearing material interposed between said members comprising one or more compressed fabric material inserts impregnated with a lubricant, and one or more dense plastic inserts between said members adjacent said fabric to exert confining pressure on said fabric, and said inserts being dimensioned whereby normal bearing movement in the absence of shock loads is borne by said fabric material.

5. A bearing comprising spaced members positioned in load bearing relation, one to be movable relative to the other, each of said members having a complemental contour in the direction of movement, and bearing material interposed between said members comprising one or more compressed fabric material inserts impregnated with a lubricant, and one or more dense plastic inserts between said members adjacent said fabric to exert confining pressure on said fabric, and said inserts being dimensioned whereby normal bearing movement in the absence of shock loads is borne by said fabric material.

6. A bearing comprising spaced members positioned in load bearing relation, one to be movable relative to the other, each of said members having a complemental contour in the direction of movement, and at least one of said members having a varying contour in the direction normal to the direction of movement, bearing material interposed between said members comprising one or more compressed fabric material inserts impregnated with a lubricant, and one or more dense plastic inserts between said members adjacent said fabric to exert confining pressure on said fabric, said inserts being dimensioned whereby normal bearing movement in the absence of shock loads is borne by said fabric material.

7. A bearing comprising spaced members positioned in load bearing relation, one to be movable relative to the other, and bearing material interposed between said members comprising one or more compressed fabric material inserts impregnated with a lubricant, one or more inserts of dense plastic adjacent said fabric material, means restraining said plastic inserts against axial movement and to exert axial pressure on said fabric inserts, said fabric being dimensioned to fill the space between the members to serve in primary load carrying capacity, the plastic being dimensioned in thickness and position to clear one of said spaced members in normal operation but positioned to receive loads of sufficient character to compress the fabric inserts.

8. A bearing to absorb compressive and end thrust loads which comprises spaced members in load bearing relation, one to be movable relative to the other, and bearing material interposed between said members comprising one or more compressed fabric pieces impregnated with a lubricant and one or more dense plastic inserts between said members, said fabric being dimensioned to fill the space between the members and to serve in primary load carrying capacity, the plastic being dimensioned in thickness and positioned to clear the moving member by a few thousandths of an inch in normal operation of the bearing, said plastic being formed to extend in the direction of the compressive load over a portion of one of said members, means on the other of said members to bear against said extending portion to transfer end thrust loads thereto, said fabric being compressible to the extent of said clearance without destruction of the fibers therein.

9. A bearing as defined in claim 8 in which the fabric inserts are compressed prior to assembly and in which the plastic inserts are positioned to maintain said inserts in compressed condition in operation.

10. A bearing as defined in claim 8 in which means on each of said spaced members overlies a surface at opposite ends of said inserts in a direction of the compressive load to absorb end thrust loads.

11. A bearing comprising spaced members positioned in load bearing relation, one to be movable relative to the other, and bearing material interposed between said members comprising a resilient, absorbent material formed of individual fibers, said material being compressible and capable of carrying a substantial quantity of lubricant, and a slightly flowable plastic non-metallic material confining the edges of said fibrous material and positioned to share loads on said bearing sufficient to compress said fibrous material.

12. A bearing comprising cylindrical inner and outer members positioned concentrically in spaced bearing relation and axial bearing inserts arranged between said members in parallel relation to the axis of said members, said inserts comprising alternate, mutually confining, strips of lubricant impregnated material filling the radial dimension between said members, and strips of a slightly flowable and non-metallic resilient dense material having a greater resistance to deformation than said first material, and dimensioned to clear one of said members in normal loading of said bearing.

13. A bearing as defined in claim 12 in which the strips of dense material are connected integrally at alternate ends by connecting strips at the ends of the cylindrical members.

14. A bearing comprising spaced members positioned in load bearing relation, one to be movable relative to the other, each of said bearings having portions to overlie the other in two directions, molded plastic shear resistant inserts interposed between said overlying portions to resist relative motion between the members in one direction, and bearing material inserts interposed between said members to bear load in the other direction, said bearing material comprising resilient compressible material confined against expansion by said shear resistant inserts.

15. A bearing comprising an inner member having outwardly extending radial shoulders, an outer member spaced radially with respect to said inner member and having inwardly extending radial shoulders spaced more widely than the shoulders on the inner member, thrust washers between said shoulders to resist end thrust on said members, and bearing material between said members comprising resilient lubricant impregnated material and adjoining dense material confined between said members and between said thrust washers against endwise displacement.

16. A bearing comprising spaced members positioned in load-bearing relation, one to be movable relative to the other, and bearing material interposed between said members comprising parallel strips of fibrous, resilient, lubricant impregnated material, and a slightly resilient plastic spiralled together to form a cylindrical lining between said members and dimensioned to share loads on said bearing sufficient to compress said fibrous material.

17. A circular bearing assembly for low overall area loads comprising spaced inner and outer bearing members, and a composite insert for interposition between said members comprising paralleled portions of lubricant impregnated material made from individual fibers and relatively dense non-metallic plastic, each deformable under load to a degree to conform to the bearing surface exposed thereto whereby the load is distributed to produce a low unit area factor.

18. A bearing comprising cylindrical inner and outer members positioned concentrically in spaced bearing relation, and bearing material interposed between said members comprising cylindrical bearing inserts composed of a slightly flowable and resilient, dense material such as nylon positioned between said bearing members at the ends thereof, and one or more cylindrical inserts of resilient fibrous material impregnated with a lubricant interposed between said first inserts and confined thereby between said members, the inserts of dense material being dimensioned in thickness and positioned to confine the edges of the resilient material and to clear one of said bearing members by a few thousandths of an inch in normal operation of the bearing.

19. A bearing comprising cylindrical inner and outer members positioned concentrically in spaced bearing relation, and bearing material interposed between said members comprising cylindrical bearing inserts composed of a slightly flowable and resilient, dense material such as nylon positioned between said bearing members at the ends thereof, and one or more cylindrical inserts of resilient fibrous material impregnated with a lubricant interposed between said first inserts and confined thereby between said members, and means at the ends of said members to confine said inserts of dense material against axial dislodgement and to maintain pressure on the resilient material confined between said inserts.

References Cited in the file of this patent

UNITED STATES PATENTS

| Number | Name | Date |
|---|---|---|
| 1,787,810 | Bigelow et al. | Jan. 6, 1931 |
| 2,276,349 | Scully et al. | Mar. 17, 1942 |
| 2,439,971 | Freeman | Apr. 20, 1948 |

FOREIGN PATENTS

| Number | Country | Date |
|---|---|---|
| 561,165 | Great Britain | May 8, 1944 |